(12) United States Patent
Kim

(10) Patent No.: US 7,280,509 B2
(45) Date of Patent: Oct. 9, 2007

(54) CDMA 3X BASE TRANSCEIVER STATION IN MOBILE COMMUNICATION SYSTEM

(75) Inventor: Jong-Ho Kim, Seoul (KR)

(73) Assignee: UTStarcom, Inc., Alameda, CA (US)

( * ) Notice: Subject to any disclaimer, the term of this patent is extended or adjusted under 35 U.S.C. 154(b) by 705 days.

(21) Appl. No.: 09/855,904

(22) Filed: May 15, 2001

(65) Prior Publication Data

US 2002/0001293 A1   Jan. 3, 2002

(30) Foreign Application Priority Data

May 17, 2000  (KR) .............................. 2000-26433

(51) Int. Cl.
*H04B 7/216* (2006.01)
*H04B 1/18* (2006.01)
*H04B 1/38* (2006.01)
*H04M 1/00* (2006.01)

(52) U.S. Cl. ................... 370/335; 455/188.1; 455/552; 455/561; 370/342

(58) Field of Classification Search ................ 370/335, 370/342, 401–402, 351–356; 455/560–561
See application file for complete search history.

(56) References Cited

U.S. PATENT DOCUMENTS

| | | | |
|---|---|---|---|
| 5,862,461 A * | 1/1999 | Yoshizawa et al. ...... 455/127.3 |
| 5,872,823 A * | 2/1999 | Sutton ......................... 375/356 |
| 5,915,212 A * | 6/1999 | Przelomiec et al. ...... 455/552.1 |
| 5,991,628 A | 11/1999 | Pedziwiatr et al. ......... 455/443 |
| 6,075,989 A | 6/2000 | Moore et al. ................ 455/436 |
| 6,081,515 A | 6/2000 | Toivola ....................... 370/339 |
| 6,104,935 A | 8/2000 | Smith et al. ................ 455/562 |
| 6,161,024 A | 12/2000 | Komara ....................... 455/562 |
| 6,173,006 B1 * | 1/2001 | Kent et al. ................... 370/342 |
| 6,178,193 B1 | 1/2001 | Kondo ......................... 375/130 |
| 6,219,562 B1 * | 4/2001 | Williams ..................... 455/561 |
| 6,256,511 B1 * | 7/2001 | Brown et al. ............. 455/552.1 |
| 6,359,940 B1 * | 3/2002 | Ciccarelli et al. ........... 375/335 |
| 6,363,262 B1 * | 3/2002 | McNicol ...................... 455/561 |
| 6,466,768 B1 * | 10/2002 | Agahi-Kesheh et al. . 455/553.1 |
| 6,519,456 B2 * | 2/2003 | Antonio et al. ............. 455/442 |
| 6,532,249 B1 * | 3/2003 | Hwang ........................ 375/130 |
| 6,535,499 B1 * | 3/2003 | Futamura et al. ........... 370/342 |
| 6,584,090 B1 * | 6/2003 | Abdelgany et al. ...... 455/552.1 |
| 6,584,304 B1 * | 6/2003 | Thomsen et al. ........ 455/552.1 |
| 2002/0064142 A1 * | 5/2002 | Antonio et al. ............. 370/335 |

* cited by examiner

*Primary Examiner*—Steven Nguyen

(57) ABSTRACT

A base transceiver station in a mobile communication system, includes a GPS time frequency unit for outputting a synchronized time which is received from at least one GPS satellite and frequency information; a BTS main processing unit for generating a control command to control one BTS; an ATM interface unit for interfacing with an asynchronous mode communication device; a packet routing unit for providing routing information used for setting path of packet data; a multi-rate channel unit for processing an inter-channel communication, each channel having a different data rate; a signal transformation unit for transforming and modulation/demodulation of an input signal; and a wireless unit for wireless communication with a mobile station.

4 Claims, 6 Drawing Sheets

CDMA 3X BASE TRANSCEIVER STATION IN MOBILE COMMUNICATION SYSTEM

FIELD OF THE INVENTION

The present invention relates to a base transceiver station; and, more particularly, to a base transceiver station in a mobile communication system for increasing capacity two times or more than that of a conventional base station by supporting direct spread and multi-carrier, and for making a high speed data processing possible.

DESCRIPTION OF THE PRIOR ART

Generally, a mobile communication system includes a mobile station which is a communication terminal, lots of base transceiver stations (BTS) for wireless relaying arrival and sending signals of the communication means which is located in a predetermined region, a base station controller (BSC) for controlling the BTS, a mobile switching center (MSC) for performing a switching function of a call which is transmitted through the BSC and a home location register for transmitting information when there exists requirement of user information.

Especially, the BTS includes a BTS control processor (BCP) for performing general management of the BTS, a digital unit (DU) for performing signal processing function of a channel, a time & frequency unit (TFU) for providing a standard frequency and timing to the BTS, a radio frequency (RF) unit for processing a RF signal and a BTS interconnection network (BIN) for performing a packet routing function with the control unit.

In a conventional BTS system, a bandwidth of a transmitting/receiving carrier is conflicted to 1.25 MHz so hard to provide multimedia services such as video service and wireless internet service.

For example, when transmitting a predetermined information about 1.25 MHz band through a radio channel, the conventional BTS processes only narrow banded single carrier of 1.25 MHz. Moreover, the conventional BTS cannot process multi-carrier so it cannot support speedy data service.

Therefore, a BTS system of treating wide-banded frequency for speedy data service and supplying wide banded multi-carrier for adapting in a mixture in proportion to IS-2000 and IS-95 originated BTS, according to a network evolution to IMT-2000, is required.

SUMMARY OF THE INVENTION

It is, therefore, an object of the present invention to provide a base station system in a mobile communication system for making a single carrier, multi carrier and direct spread possible by selecting bandwidth between 1.25 MHz and 5 MHz and in case of evolving to CDMA2000 3X system, uses RF switches and SAW filters of a transceiver unit without amendment and increasing capacity more than two times than that of conventional BTS.

Another object of the present invention is to divide a multi-carrier by an allocated frequency for accepting a multi-carrier in a analog down-converter card assembly (ADCA).

In accordance with an aspect of the present invention, there is provided a base transceiver station in a mobile communication system, comprising: a GPS time frequency unit for outputting a synchronized time which is received from at least one GPS satellite and frequency information; a BTS main processing unit for generating a control command to control one BTS; an ATM interface unit for interfacing with an asynchronous mode communication device; a packet routing unit for providing routing information used for setting path of packet data; a multi-rate channel unit for processing an inter-channel communication, each channel having a different data rate; a signal transformation unit for transforming and modulation/demodulation of an input signal; and a wireless unit for wireless communication with a mobile station.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Hereinafter, a base transceiver station in a mobile communication system according to the present invention will be described in detail referring to the accompanying drawings.

Figure 1:
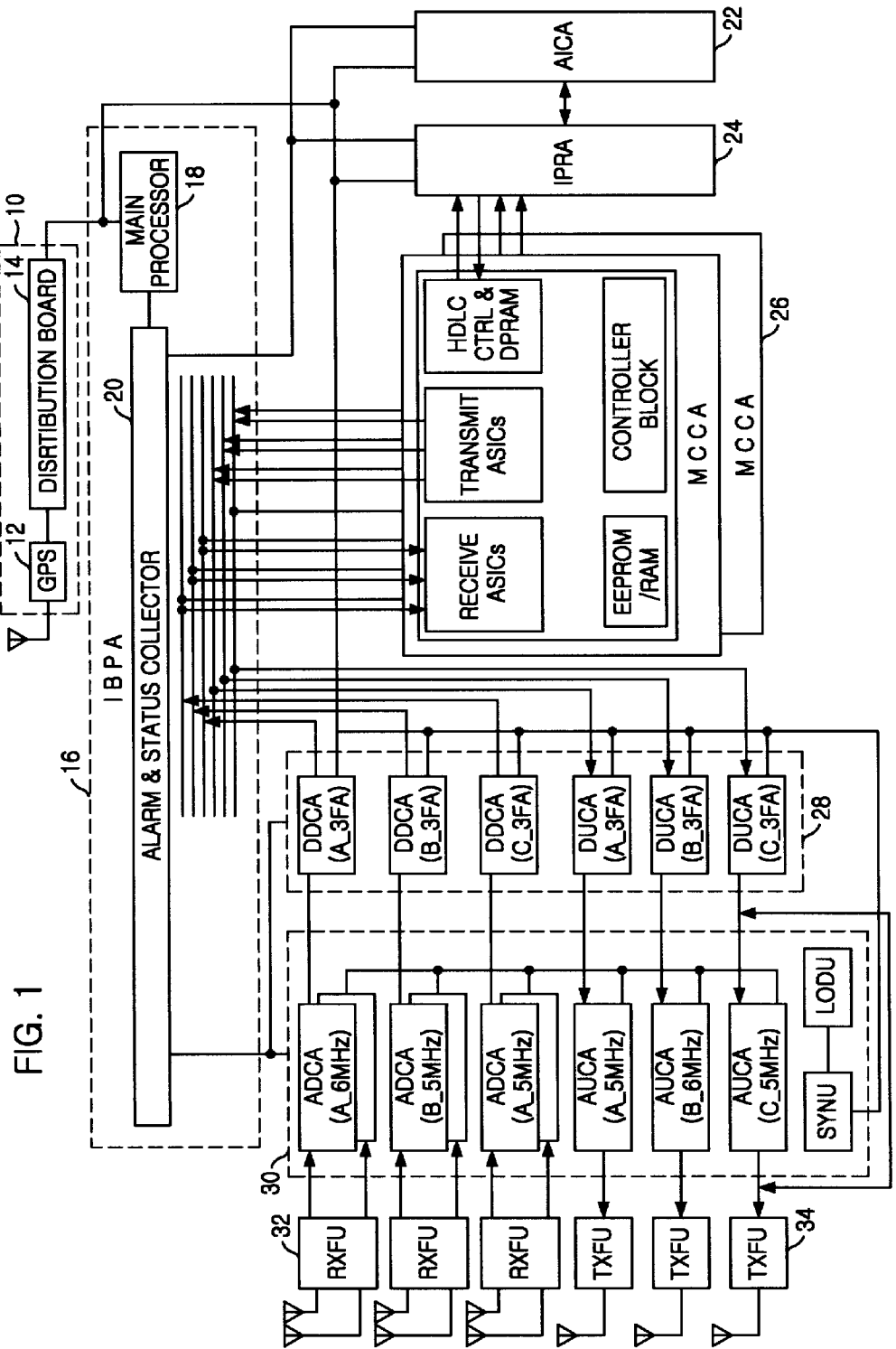
FIG. 1 is a block diagram illustrating a base transceiver station in mobile communication system in accordance with the present invention.

FIG. 1 is a block diagram illustrating a base transceiver station in mobile communication system in accordance with the present invention. A GPS time frequency unit 10, which outputs location information received from at least one GPS satellite, includes a GPS receiver 12 for receiving a GPS signal and a distribution board 14 for distributing received information from the GPS receiver 12 to each device which requires synchronization in time and frequency.

The GPS time frequency unit 10 is connected to an IS-2000 BTS main processor card assembly (IBPA) 16 which generates a control signal for managing each structural element of the BTS. The IBPA 16 includes an alarm & status collector 20 for collecting the BTS status and issuing an alarm signal when the status is over a predetermined limit and a main processor 18 which generates a control signal for controlling the BTS.

Also, the IBPA 16 is connected to an asynchronous transfer interface card assembly (AICA) 22 for interfacing with asynchronous transfer mode devices and an inter packet router card assembly (IPRA) 24 for routing a packet data.

The IBPA 16 is also respectively connected to a multi rate channel card assembly (MCCA) 26 for processing an inter-channel data having different rate and a digital down & up converter card assembly (DDCA & DUCA) 28 for up/down converting a digital signal.

In here, the MCCA 26, the DDCA 28 and the DUCA 28 are connected to a receive ASIC for receiving data from the IBPA 16, an analog up converter card assembly (AUCA) 30 for up converting an analog signal and to an analog down converter, respectively.

The ADCA 30 is connected to a RX front end unit (RXFU) 32, which is low noise amplifying the received signal, and the AUCA 30 is connected to a TX front end unit (TXFU) 34 which restricts band of a transmitting signal and transmits it to an antenna.

Also, two receiving antennas and one transmitting antenna include the RXFU 32 and the TXFU 34, respectively.

An operation flow of the BTS is accounted by emphasizing a wireless transmitting/receiving unit and is divided into two cases—a forward link which emits a radio signal through an antenna and a reverse link which receives a wireless signal from the outside.

Figure 2:
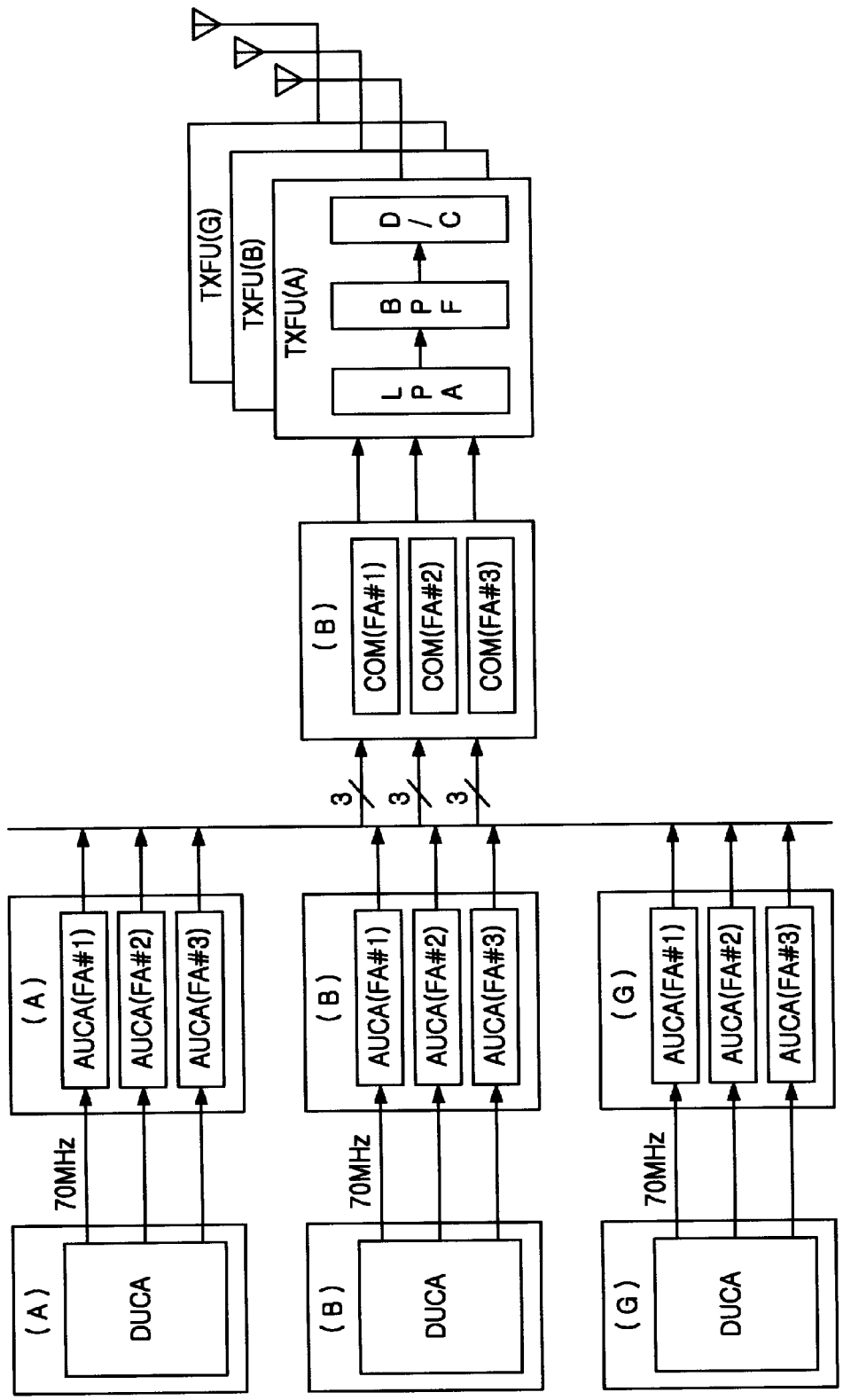
FIG. 2 is a block diagram showing a forward link constitution of a base transceiver station in accordance with the present invention.

FIG. 2 is a block diagram showing a forward link constitution of a base transceiver station in accordance with the present invention.

One DUCA is connected with three of AUCA and three of AUCA are connected with one combiner. Each of combiner is connected with each of TXFU and each of TXFU interfaces antenna.

In here, each of TXFU includes a linear power amplifier, a band pass filter and directional coupler, and the combiner, inputted signal is transmitted to the antenna via the linear power amplifier, the band pass filter and the directional coupler, consecutively.

On the contrary, the reverse link case that receives a signal from the outside is as below.

Figure 3:
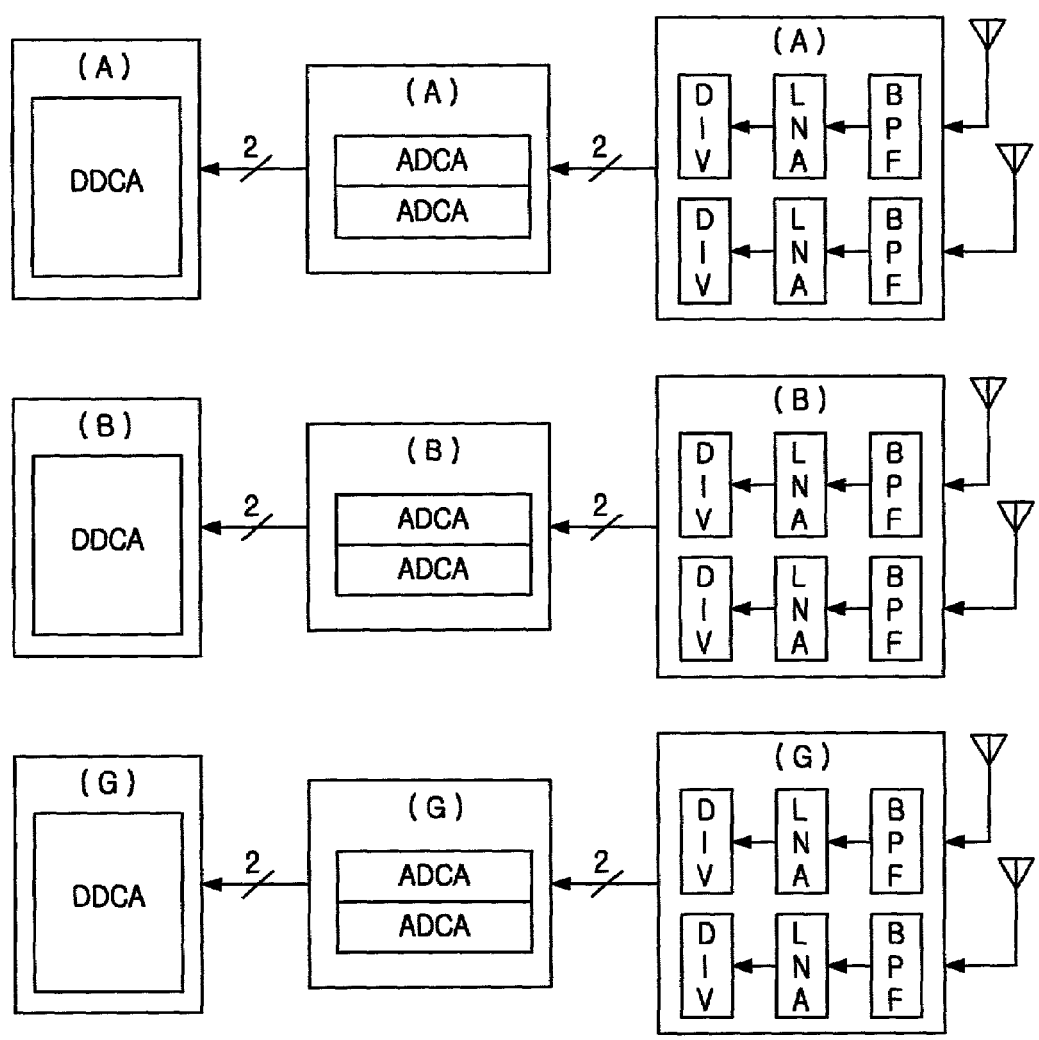
FIG. 3 is a block diagram showing a reverse link constitution of a base transceiver station in accordance with the present invention.

FIG. 3 is a block diagram showing a reverse link constitution of a base transceiver station in accordance with the present invention. One RXFU interfaces one receiving antenna and each of RXFU has one path. That is, one RXFU has one independent module and each module is being one path. The module includes a band pass filter, a low noise amplifier and a power divider.

Therefore, each of band pass filter of the RXFU is connected with each of receiving antenna and each of power divider is connected with each of ADCA.

The base transceiver station system in a mobile communication system in accordance with the present invention satisfies recommendation of IS 2000 and CDMA 2000.

Figure 4:
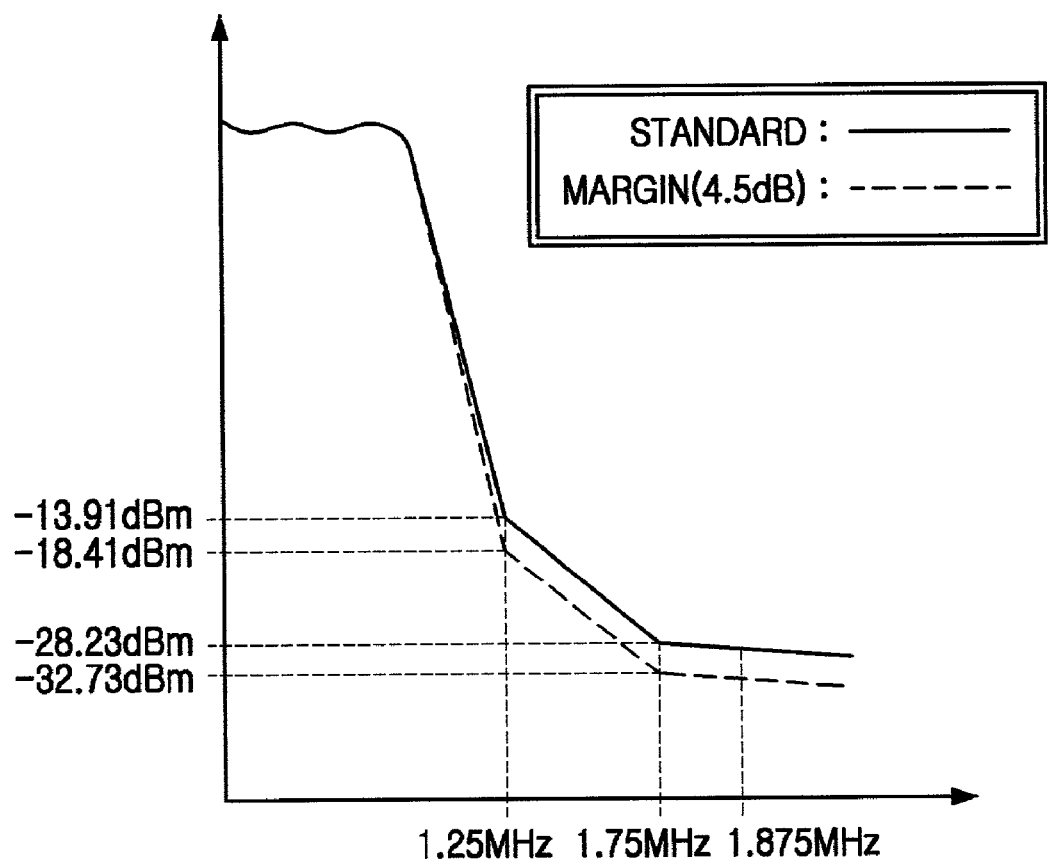
FIG. 4 is a graph showing a total RF output level compared to frequency of TXFU in FIG. 1.

FIG. 4 is a graph showing a total RF power level compared to frequency of the TXFU in FIG. 1. An interface part of RF in the BTS is as below.

Figure 5:
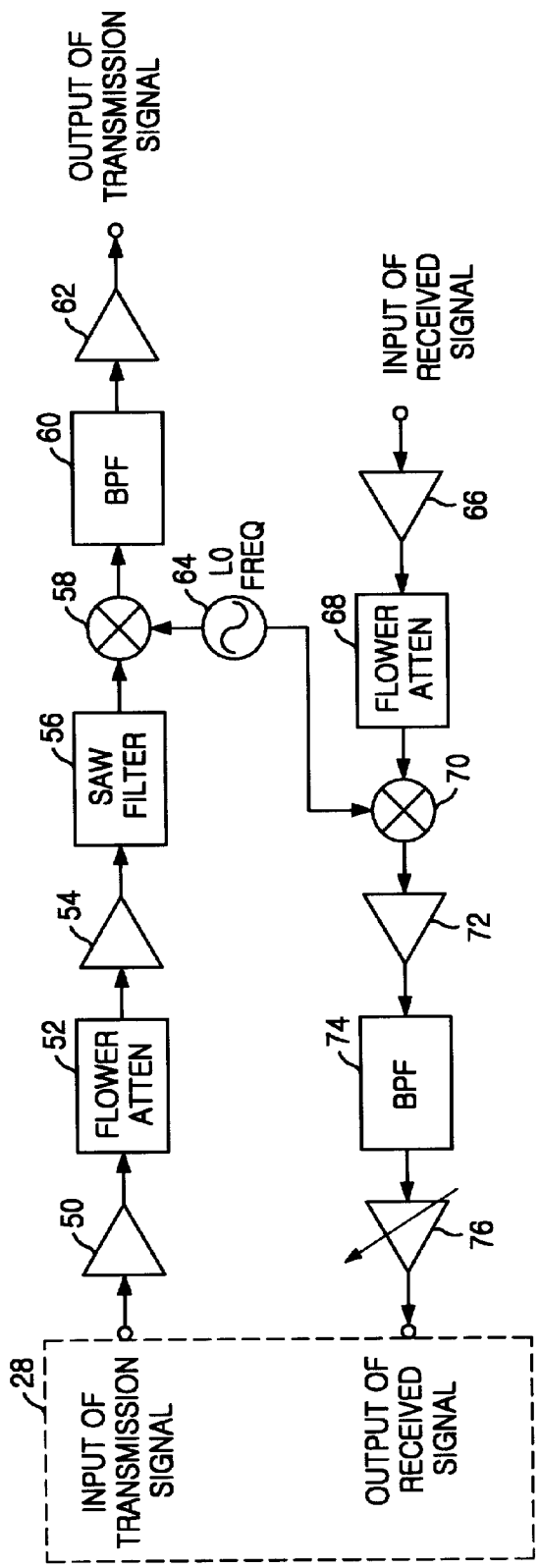
FIG. 5 is a block diagram specifically showing an interfacing part with a RF device of a base station system in accordance with the present invention.

FIG. 5 is a block diagram specifically showing an interfacing part with a RF device of a base transceiver station in accordance with the present invention. An input signal of the TXFU is inputted from the last amplifier 62, via a band pass filter 60, a mixer 58, a saw filter 56, a second amplifier 54, flower attenuator 52 and a fist amplifier 50.

An input signal of the DDCA is inputted from a variable amplifier 76, via a band pass filter 74, an amplifier 72, a mixer 70, a flower attenuator 68 and a low noise amplifier 66.

The base transceiver station in accordance with the present invention can select bandwidth by using the RF switch 80a and 80b.

Figure 6:
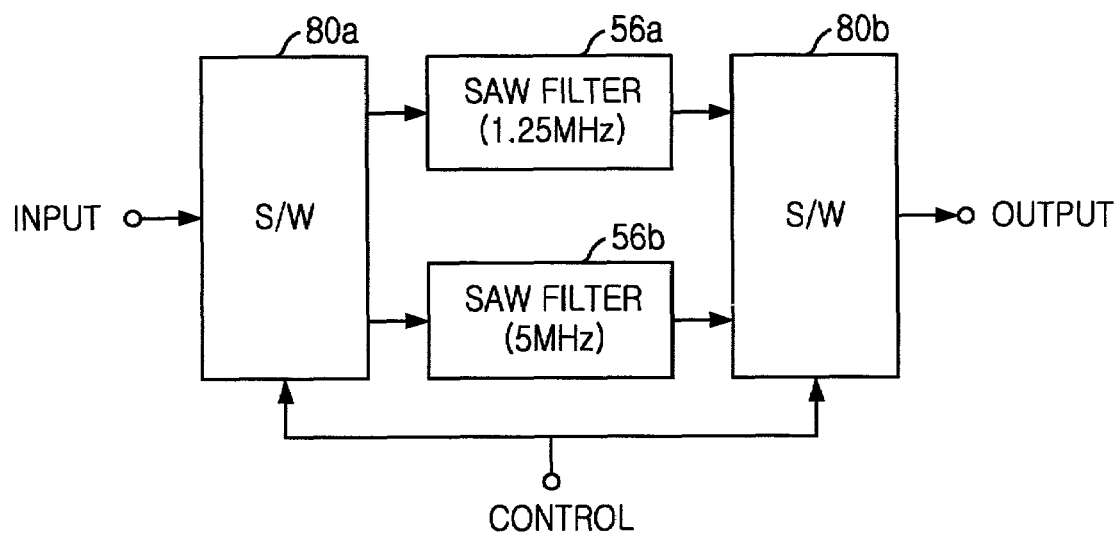
FIG. 6 is a block diagram showing a switching form of a SAW filter in FIG. 5.

FIG. 6 is a block diagram showing a switching form of a SAW filter in FIG. 5. A first SAW filter 56a and a second SAW filter 56b which provide 1.25 MHz of bandwidth and 5 MHz bandwidth are interfaced and a first and a second switch 80a, 80b are connected with the end of each filter 56a, 56b for changing the bandwidth of the signal according to a predetermined control signal.

Figure 7:
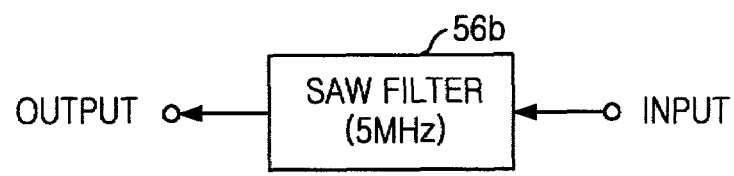
FIG. 7 is a block diagram showing another switching form of a SAW filter in FIG. 5.

As described above, a bandwidth can be composed by using the first and the second switch, and it can also be composed to support the 5 MHz bandwidth in FIG. 7.

When the conventional system and the present system is mixed, selective bandwidth operation in FIG. 6 is convenient, but if the network evolution is already completed, then a mono bandwidth operation in FIG. 7 is preferred.

Specific characteristics of the base transceiver station elements are as below.

1) AUCA

The AUCA performs forward direct frequency conversion and the ADCA performs reverse direct frequency conversion.

2) MCCA

The MCCA is located in a digital shelf and performing call processing function in the cell, and interfaced with the DUCA/DDCA unit, so in case of the forward/backward link, gives and takes a digital sampling signal from the DUCA/DDCA.

Also, the MCCA is communicated with IBPA and HDLC through an internal bus and all status information of the MCCA are transmitted to the IBPA through the path. The MCCA is usually interfaced with a cell controller and gives and takes a call setup, a call cutting and hand-off related information. The MCCA has a data transmission path of 32 channels, at least, and has a Walsh code length of 4 bits to 256 bits according to a wireless environment and data rate. The MCCA supports all the synchronous and asynchronous communication and if it provides data service, it has speed of 2 Mbps.

Also, in case of a reverse link, the MCCA has a continued pilot signal and when a data rate is over 14400 bps, supports highly efficient FEC coding, and supports quadrature phase shift keying (QPSK) instead of conventional binary phase shift keying (BPSK) as a double forward link Walsh channel.

3) IBPA

The IBPA is a control unit that wholly operates and manages the base transceiver station. The IBPA generates a control signal for call processing and maintenance and controls the DUCA/DDCA and a RF unit, respectively and is interfaced with the BTS to transmit and receive traffic and control information.

The IBPA has a wireless resources managing function, a packet routing, an error detecting, a statistical information selecting and reporting function. That is, the IBPA allots and manages CDMA frequency, a channel and a frame offset resources and connects traffic control information to a BTS controller and the ATM, and routes traffic and control information which are received from the BTS controller and the ATM to a corresponding PBA unit. The IBPA detects an error within a BTS device and reports the error to a BTS maintenance unit, collects statistical information about a call and reports the information to the BTS maintenance unit and reports an alarm of the BTS device.

Also, the IBPS has a call processing function. That is, the IBPS processes a general call, which includes arrival and sending signal, a softer hand-off call, a soft hand-off call and a hard hand-off call.

The IBPS has a system optical information management function between a mobile station and the BTS. That is, it receives and manages GPS optical information and provides system optical information within the mobile station and the BTS.

Also, the IBPA performs a forward and a reverse link power control function and a wireless signal transmit and receive function. That is, it performs a wireless signal transmit and receive function which includes allotting of a pilot channel, a synchronous channel, an access channel, a paging channel and a traffic channel.

4) DUCA/DDCA unit

The DUCA/DDCA unit performs a function of minimizing signal difference of a clock signals and the forward/reverse links and is located between the channel card ADCA and AUCA to transform a digital signal of the channel card to medium frequency signal then applies it to the AUCA, or transform a medium frequency signal to a digital signal then applies it to the channel card.

5) STFU

The STFU includes a PBA form that adds GPS, which receives related data from a GPS satellite, and TFCA function, which receives the data and provides time information and standard clock to the BST.

According to the preferred embodiment as described above, in a wireless channel of a mobile communication system, a structure planning technology of CDMA 2000 3X BTS, which has 5 MHz bandwidth for supporting a multi-carrier and a direct spread method and be able to carry out high rate data service, may be utilized to a fundamental technology for an improved BTS design and has two times of a CDMA capacity than a conventional cellular and a personal communication services (PCS) system, therefore, a multimedia service is possible.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A base transceiver station (BTS) in a mobile communication system, comprising:
 a BTS main processing unit for generating a control command to control one BTS;
 a multi-rate channel unit for processing an inter-channel communication, each channel having one of a plurality of different data rates, said multi-rate channel unit producing a digital input signal;
 a signal transformation unit for transforming and modulating the digital input signal received from said multi-rate channel unit, wherein said signal transformation unit comprises (i) a digital-signal transformation unit for converting the digital-input signal into a medium-frequency analog signal and (ii) an analog-signal transformation unit that receives the medium-frequency analog signal and produces an analog output signal, wherein the analog-signal transformation unit includes radio frequency (RF) switches for dynamically selecting one of a plurality of bandpass filters to provide selective forward-link-bandwidth operation, wherein the selected bandpass filter determines a bandwith of the analog output signal; and
 a wireless unit connected to said signal transformation unit, said wireless unit for receiving the analog output signal from the signal transformation unit and for wirelessly communicating that analog output signal to a mobile station.

2. The base transceiver station as recited in claim 1, wherein the wireless unit includes three transmitting frequency units and three receiving frequency units.

3. The base transceiver station as recited in claim 1, wherein the signal transformation unit includes an analog up converter, an analog down converter, a digital up converter and a digital down converter.

4. The base transceiver station as recited in claim 1, wherein the multi-rate channel unit includes a transmitting integrated circuit for processing an input signal, a receiving integrated circuit for processing an output signal, a HDLC controller for controlling a HDLC communication and a controlling software block for performing a pre-reserved program and transmitting it to each device.

* * * * *